(12) United States Patent
Zhao et al.

(10) Patent No.: US 10,908,483 B2
(45) Date of Patent: Feb. 2, 2021

(54) LOAD BRACKET AND GIMBAL

(71) Applicant: SZ DJI OSMO TECHNOLOGY CO., LTD., Shenzhen (CN)

(72) Inventors: Yanchong Zhao, Shenzhen (CN); Weidong Li, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/446,275

(22) Filed: Jun. 19, 2019

(65) Prior Publication Data
US 2019/0302578 A1    Oct. 3, 2019

Related U.S. Application Data

(63) Continuation of application No. PCT/CN2017/072452, filed on Jan. 24, 2017.

(30) Foreign Application Priority Data

Dec. 28, 2016   (CN) .................... 2016 2 1462399 U (51) Int. Cl.
| G03B 17/56 | (2006.01) |
| F16M 13/02 | (2006.01) |
| F16M 11/12 | (2006.01) |
| F16M 13/04 | (2006.01) |
| F16M 11/18 | (2006.01) |

(52) U.S. Cl.
CPC .......... *G03B 17/561* (2013.01); *F16M 11/12* (2013.01); *F16M 11/18* (2013.01); *F16M 13/022* (2013.01); *F16M 13/04* (2013.01); *G03B 17/56* (2013.01); *F16M 2200/025* (2013.01)

(58) Field of Classification Search
CPC ........ G03B 17/56; F16M 11/04; F16M 11/10; F16M 11/12; F16M 11/18
USPC ......................................................... 396/428
See application file for complete search history.

(56) References Cited

U.S. PATENT DOCUMENTS

| 3,352,521 A | 11/1967 | Tyler | |
| 2017/0131622 A1* | 5/2017 | Zhao | .................... G03B 17/561 |
| 2019/0302578 A1* | 10/2019 | Zhao | .................... F16M 11/205 |

FOREIGN PATENT DOCUMENTS

| CN | 201765421 U | 3/2011 | |
| CN | 104254725 A | 12/2014 | |
| CN | 104395666 A | 3/2015 | |
| CN | 104603517 A | 5/2015 | |
| CN | 204437591 * | 7/2015 | ............. F16M 11/04 |
| CN | 204437591 U | 7/2015 | |

(Continued)

OTHER PUBLICATIONS

World Intellectual Property Organization (WIPO) International Search Report for PCT/CN2017/072452 daed Aug. 29, 2017 6 Pages.

*Primary Examiner* — Clayton E. LaBalle
*Assistant Examiner* — Kevin C Butler
(74) *Attorney, Agent, or Firm* — Anova Law Group, PLLC (57) ABSTRACT

A load bracket includes a guide rod, a locking assembly slidably arranged at the guide rod, and a mounting plate slidably arranged at the locking assembly. The locking assembly includes a clamping assembly arranged at the guide rod and connected to the mounting plate, and a driving member connected to the clamping assembly. The driving member is configured to drive the clamping assembly to clamp the guide rod and to cause the mounting plate to abut against the clamping assembly.

19 Claims, 5 Drawing Sheets

(56) References Cited

FOREIGN PATENT DOCUMENTS

| CN | 2017/072452 A1 | 10/2015 |
| CN | 105518757 A | 4/2016 |
| CN | 105782661 A | 7/2016 |
| CN | 205504410 U | 8/2016 |

* cited by examiner

LOAD BRACKET AND GIMBAL

CROSS-REFERENCE TO RELATED APPLICATION

This application is a continuation of International Application No. PCT/CN2017/072452, filed on Jan. 24, 2017, which claims priority to Chinese Application No. 201621462399.6, filed on Dec. 28, 2016, the entire contents of both of which are incorporated herein by reference.

TECHNICAL FIELD

The present disclosure relates to a load bracket and a gimbal having the load bracket.

BACKGROUND

A photographing apparatus generally includes a gimbal and a camera carried by the gimbal. The gimbal is configured to fix the camera and adjust an attitude of the camera, for example, change an orientation of the camera and stabilize the camera in a preset attitude to realize a stable, smooth, and multi-angle photographing. Currently, the gimbal needs to be adapted to different models of cameras and the cameras need to be assembled and disassembled all the time. When the camera is being assembled and disassembled, multiple structure members need to be locked or disassembled, the operation is tedious, and the problems, such as an improper operation, a missing operation, or the like, easily occur.

SUMMARY

In accordance with the disclosure, there is provided a load bracket including a guide rod, a locking assembly slidably arranged at the guide rod, and a mounting plate slidably arranged at the locking assembly. The locking assembly includes a clamping assembly arranged at the guide rod and connected to the mounting plate, and a driving member connected to the clamping assembly. The driving member is configured to drive the clamping assembly to clamp the guide rod and to cause the mounting plate to abut against the clamping assembly.

Also in accordance with the disclosure, there is provided a gimbal including a roll-axis assembly, a pitch-axis assembly, a yaw-axis assembly, and a load bracket connected to the yaw-axis assembly.

DESCRIPTION OF REFERENCE NUMERALS

Photographing apparatus 1
Roll-axis assembly 11
Roll-axis bracket 111
Pitch-axis assembly 12
Yaw-axis assembly 13
Yaw-axis bracket 131
Operation member 1310
Display screen 131a
Operation button 131b
Motor 112, 122, 132
Handheld assembly 14
Load bracket 2
First guide rod 21
Receiving groove 211
Second guide rod 22
Third guide rod 23
Fourth guide rod 24
Mounting plate 25
Connecting member 251
Mounting member 252
Sliding groove 2510
Bottom wall 2511
Side wall 2512
Extending wall 2513
Sliding slot 2514
Load 3
Locking assembly 4
Knob 41
Driving member 42
Rotating portion 421
Screw portion 423
Clamping assembly 40
First clamping member 43
Mounting surface 431
First clamping surface 432
Groove 4321
First protruding platform 433
First fixing surface 4331
Intermediate member 44
Engaging wall 441
Guide groove 442
Outer side wall 443
Fixing member 45
Second protruding platform 451
Second fixing surface 4511
First abutting surface 4512
First engaging portion 452
Second engaging portion 453
First sliding member 46
Second clamping member 47
Second clamping surface 471
Second abutting surface
Sliding bar 4731
Abutting member 48
Third protruding platform 481
Sliding block 482
Second sliding member 49
Threaded through-hole 251a
First through-hole 4310
Second through-hole 4510
Third through-hole 4710
Threaded hole 4810

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them. When a first component is referred to as "arranged" at a second component, it is intended that the first component may be directly arranged at the second component or may be indirectly arranged at the second component via a third component between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

The present disclosure provides a load bracket for mounting a load. The load bracket includes a first guide rod, a locking assembly, and a mounting plate. The mounting plate is slidably arranged at the locking assembly, and the locking assembly is slidably mounted at the first guiding rod to enable the mounting plate to slide relative to the first guiding rod. The locking assembly includes a clamping assembly arranged at the first guiding rod and coupled to the mounting plate, and a driving member coupled to the clamping assembly. When the driving member is operated, the driving member can drive the clamping assembly to clamp the first guiding rod while the mounting plate abuts the clamping assembly.

In some embodiments, the first guiding rod is provided with a receiving groove, and the longitudinal direction of the receiving groove is consistent with the longitudinal direction of the first guiding rod, and the locking assembly is slidable in the receiving groove.

In some embodiments, the load bracket further includes an intermediate member embedded in the receiving groove. The intermediate member is provided with a guide groove, and the locking assembly can slide in the guide groove.

In some embodiments, the driving member further includes a screw portion, a rotating portion, and a connecting segment arranged between the rotating portion and the screw portion. The screw portion is configured to pass through the clamping assembly and is screwed to the clamping assembly. When the screw portion rotates in a predetermined direction, the driving member can drive the mounting plate to abut the clamping assembly.

In some embodiments, the locking assembly further includes a knob fixed to the rotating portion for rotating the screw portion.

In some embodiments, the clamping assembly includes a first sliding member and a second sliding member. The first sliding member and the second sliding member are connected via the driving member, and are cooperatively mounted at the first guide rod.

In some embodiments, the first sliding member includes a first clamping member and a fixing member. The first clamping member and the fixing portion are fixedly coupled to each other and sandwich the first guiding rod.

In some embodiments, the first clamping member includes a first clamping surface and a first protruding platform extending perpendicularly from the first clamping surface. The first clamping surface attaches to a side of the first guide rod. The first protruding platform protrudes into the first guide rod from one side of the receiving groove. The fixing member includes a second protruding platform and a first engaging portion. The second protruding platform protrudes into the first guide rod from the other side of the receiving groove. The first engaging portion is engaged with another surface of the first guide rod away from the first clamping surface. The first protruding platform and the second protruding platform are fixedly connected to each other in the receiving groove. The first guide rod is sandwiched between the first clamping surface and the first engaging portion.

In some embodiments, the first clamping member is provided with a first through-hole, the fixing member is provided with a second through-hole, and the first through-hole matches the second through-hole. The driving member penetrates through the first through-hole and the second through-hole. The connecting segment of the driving member is at least partially received in the first through-hole and the second through-hole.

In some embodiments, the second sliding member includes a second clamping member and an abutting member. A third through-hole is provided at a center of the second clamping member. The abutting member includes a third protruding platform and a sliding block. The third protruding platform penetrates through the third through-hole. The mounting plate is further provided with a sliding slot. The sliding block can slide in the sliding slot of the mounting plate. The third protruding platform is provided with a threaded hole screwedly connected to the screw portion to move the abutting portion toward the first guide rod, such that the sliding block abut an upper wall of the sliding slot of the mounting plate to tighten and lock the mounting plate.

In some embodiments, the mounting plate includes a connecting member and two mounting members arranged at two sides of the connecting member, respectively. The two mounting members and the connecting member together form an approximate cross-shape.

In some embodiments, the connecting portion includes a bottom wall, two side walls, and two extending walls. The two side walls are arranged at opposite sides of the bottom wall, respectively, and approximately perpendicular to the bottom wall. The two side walls are arranged at two long sides of the bottom wall, respectively, and lengths of the two side walls equal the length of the bottom wall. The two extending walls are formed by inwardly protruding from top sides of the two side wall, respectively, and are spaced at a certain distance from the bottom wall. Each of the extending walls and the corresponding side wall form a longitudinal sliding slot.

In some embodiments, the second clamping member includes a second abutting surface, and a protruding wall extending perpendicularly from the second abutting surface away from the second clamping surface. The protruding wall includes two sliding bars arranged perpendicularly to the protruding wall and oppositely arranged. The mounting plate is provided with a sliding groove. The second clamping member can slide in the sliding groove of the mounting plate through the sliding bars.

In some embodiments, the mounting plate is further provided with a blocking portion for blocking the second clamping member and the sliding block from sliding out of the sliding groove and the sliding slot.

In some embodiments, the blocking portion includes a threaded through-hole formed at a bottom of the sliding groove and a bolt. The bolt is screwed into the threaded through-hole and partially screwed in the sliding slot, such that a portion of the bolt that penetrates in the sliding slot can function to block.

In some embodiments, the sliding groove is opened at a side wall of the connecting member.

In some embodiments, the threaded hole is screwed to the screw portion, and the extending wall of the mounting plate abuts against the second abutting surface of the second clamping member, such that the first clamping member and the second clamping member together clamp the first guide rod.

In some embodiments, the load bracket further includes a second guide rod, a third guide rod, and a fourth guide rod. The third guide rod is arranged opposite to the first guide rod, and the second guide rod is arranged opposite to the fourth guide rod. The first guide rod, the second guide rod, the third guide rod, and the fourth guide rod are connected end to end to form a quadrilateral frame.

The present disclosure also provides a gimbal including a roll-axis assembly, a pitch-axis assembly, a yaw-axis assembly, and a load bracket consistent with the disclosure. The load bracket is coupled to the pitch-axis assembly.

In some embodiments, the gimbal further includes a handheld assembly coupled to the yaw-axis assembly.

In some embodiments, the yaw-axis assembly further includes an operation member including a display screen and at least one operation button. The display screen is configured to display a plurality of operating parameters of the gimbal, The operation button is configured to select at least one operating parameter from the plurality of operating parameters displayed at the display screen to operate the gimbal.

Figure 1:
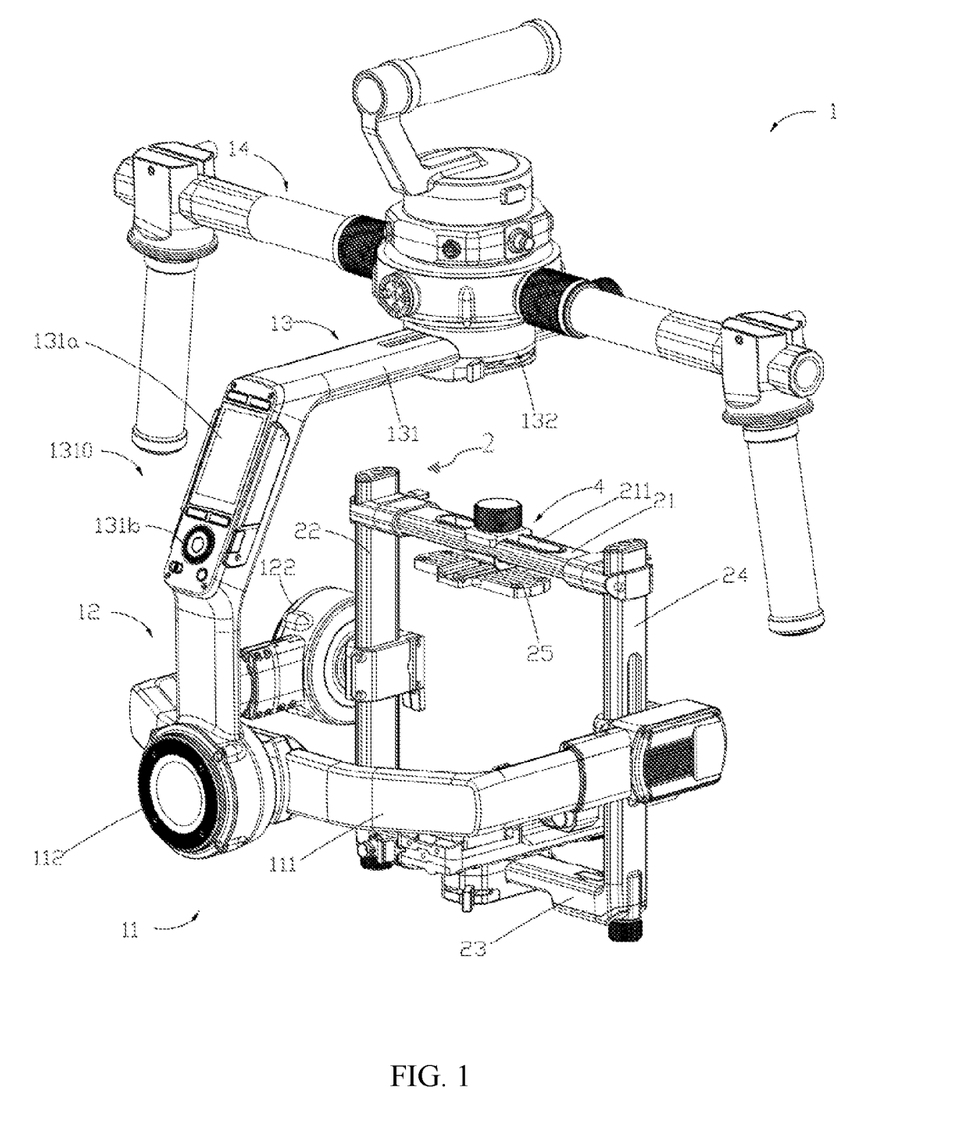
FIG. 1 is a perspective view of a gimbal according to an embodiment of the disclosure.

FIG. 1 is a perspective view of a gimbal 1 consistent with the disclosure. As shown in FIG. 1, the gimbal includes a roll-axis assembly 11, a pitch-axis assembly 12, a yaw-axis assembly 13, and a handheld assembly 14. The roll-axis assembly 11 includes a roll-axis bracket 111 and a roll-axis motor 112 configured to drive the roll-axis bracket 111 to rotate. The pitch-axis assembly 12 includes a load bracket 2 and a pitch-axis motor 122 configured to drive the load bracket 2. The yaw-axis assembly 13 includes a yaw-axis bracket 131 and a yaw-axis motor 132 configured to drive the yaw-axis bracket 131. The load bracket 2 is configured to carry a load 3 (shown in FIG. 2), change an orientation of the load 3, and stabilize the load 3 in a preset attitude. The load 3 can include different types of video recorders, cameras, or sensors. In the present disclosure, camera is used as an example of the load 3.

The roll-axis motor 112 is arranged at a side of the roll-axis bracket 111 and is configured to drive the roll-axis bracket 111 to rotate about a roll axis. An end of the load bracket 2 is connected to the pitch-axis motor 122, and another end of the load bracket 2 is rotatably arranged at another side of the roll axis bracket 111. The pitch-axis motor 122 is configured to drive the load bracket 2 to rotate about a pitch axis. An end of the yaw-axis bracket 131 is connected to the roll-axis motor 112 and another end of the yaw-axis bracket 131 is connected to the handheld assembly 14. In some embodiments, an operation member 1310 is arranged at the yaw-axis bracket 131. The operation member 1310 includes a display screen 131a and at least an operation button 131b. The display screen 131a is configured to display a plurality of operating parameters of the gimbal 1. A user can select at least one operating parameter from the plurality of operating parameters displayed on the display screen 131a by operating the operating button 131b.

Figure 2:
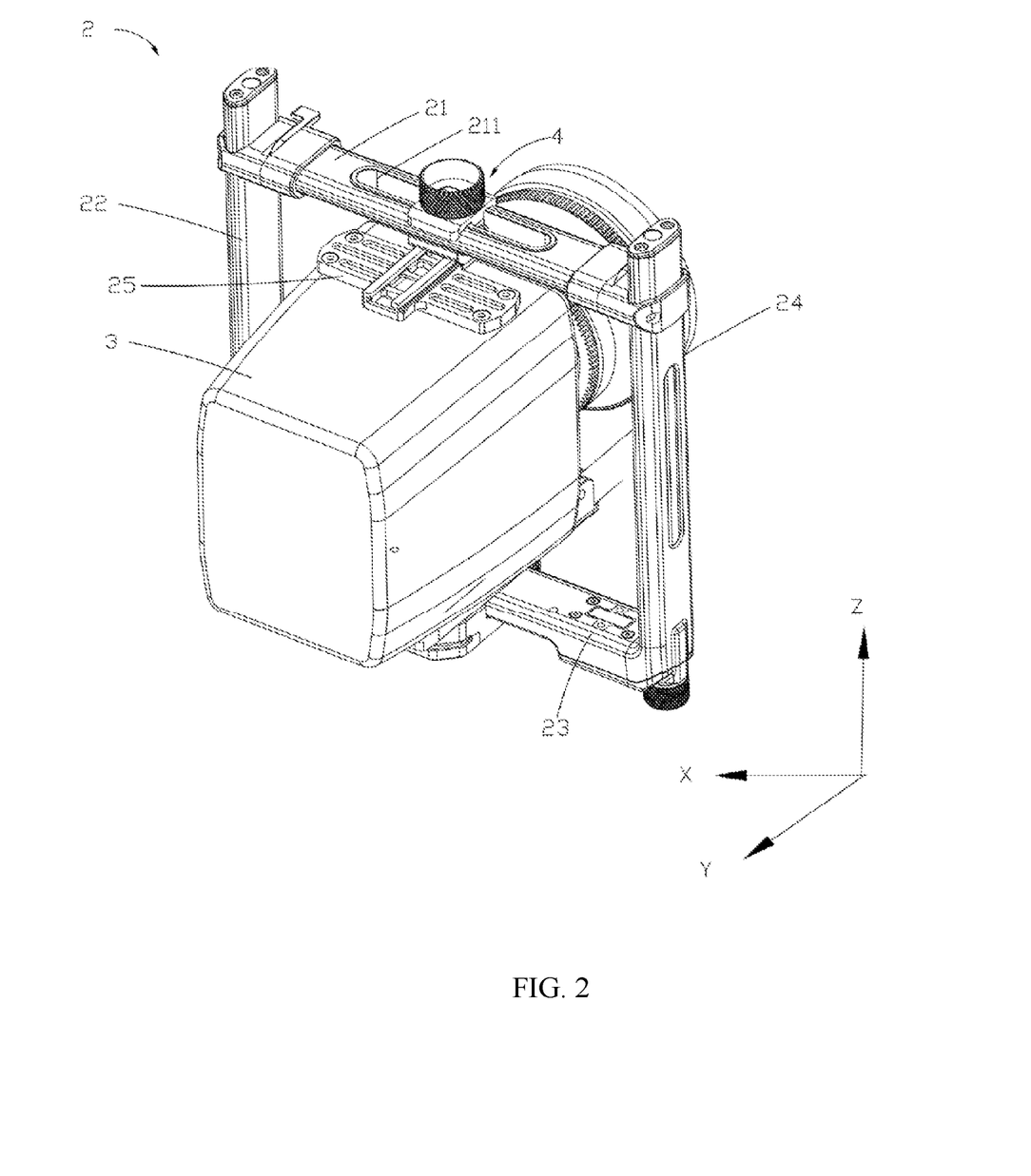
FIG. 2 is a perspective view of a load bracket in FIG. 1.
Figure 3:
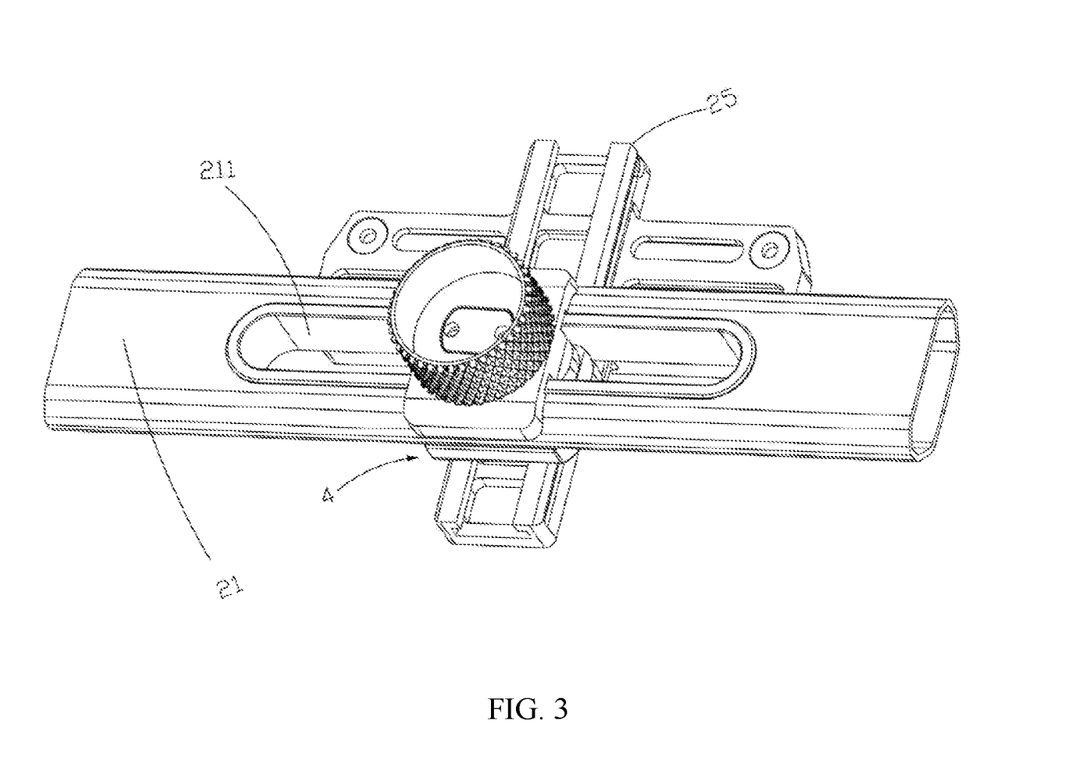
FIG. 3 schematically shows a partial structure of the load bracket in FIG. 2.

FIG. 2 is a perspective view of the load bracket 2 consistent with the disclosure. FIG. 3 schematically shows a partial structure of the load bracket 2 consistent with the disclosure. As shown in FIGS. 2 and 3, the load bracket 2 includes a first guide rod 21, a locking assembly 4, and a mounting plate 25. The locking assembly 4 is configured to simultaneously lock a plurality of structural components of the load bracket 2. In some embodiments, the mounting plate 25 can be slidably arranged at the locking assembly 4, and the locking assembly 4 can be slidably mounted at the first guide rod 21, such that the mounting plate 25 can also slide relative to the first guide rod 21. The locking assembly 4 is configured to lock the mounting plate 25 of the load bracket 2 to the locking assembly 4, and lock itself and the mounting plate 25 to the first guide rod 21.

The first guide rod 21 has a longitudinal bar-shape and is a hollow body. In some embodiments, the first guide rod 21 can have a cuboid-like shape. In some other embodiments, the first guide rod 21 can have another shape, such as a cylinder, or a solid body. A receiving groove 211 is arranged at the first guide rod 21. In some embodiments, the receiving groove 211 can be arranged at a center of the first guide rod 21. The receiving groove 211 penetrates through the first guide rod 21 across two opposite sides of the first guide rod 21. A longitudinal direction of the receiving groove 211 is coincident with a longitudinal direction of the first guide rod 21, and the locking assembly 4 can slide in the receiving groove 211.

Figure 4:
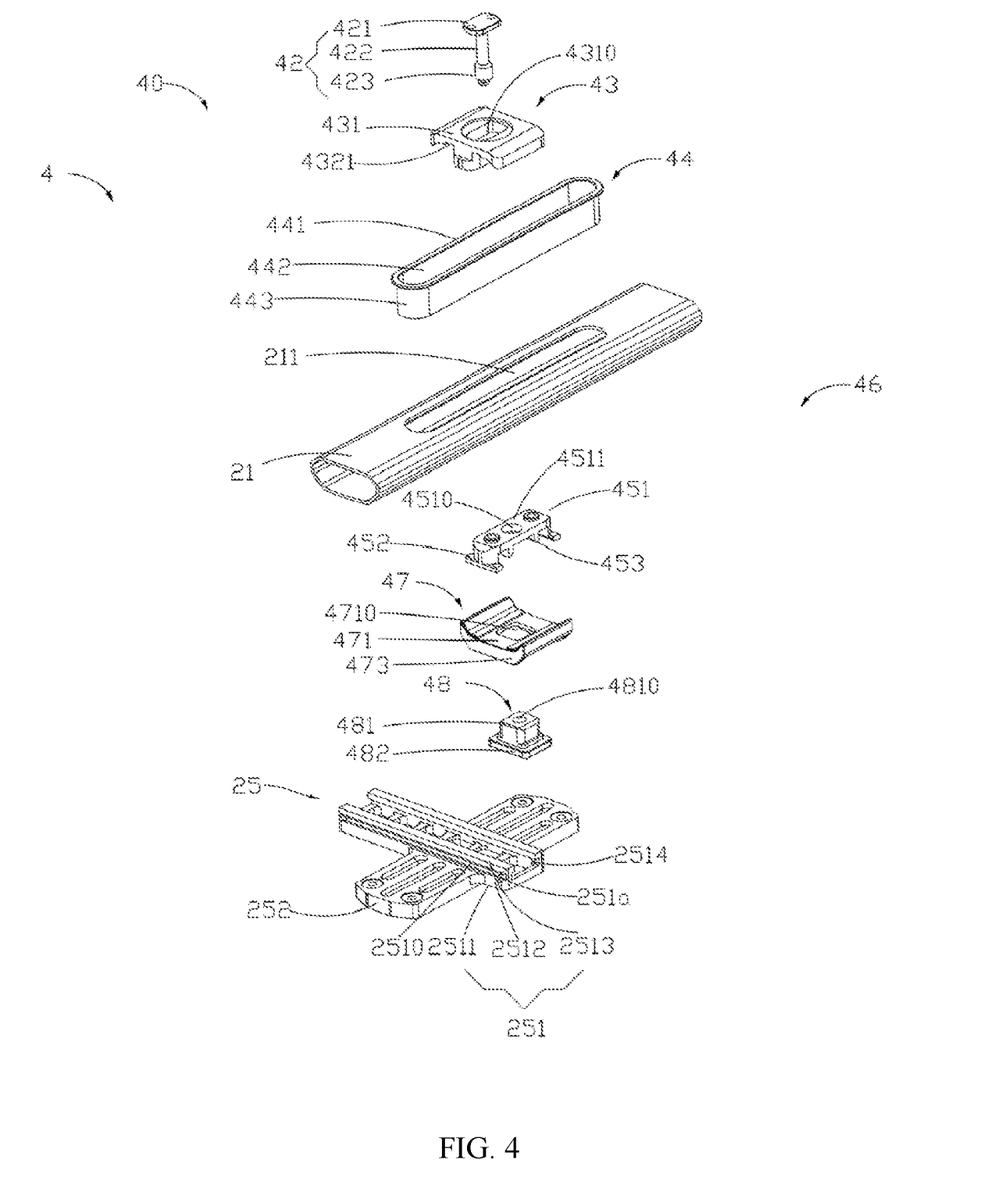
FIG. 4 is an exploded view of the partial structure of the load bracket in FIG. 3.
Figure 5:
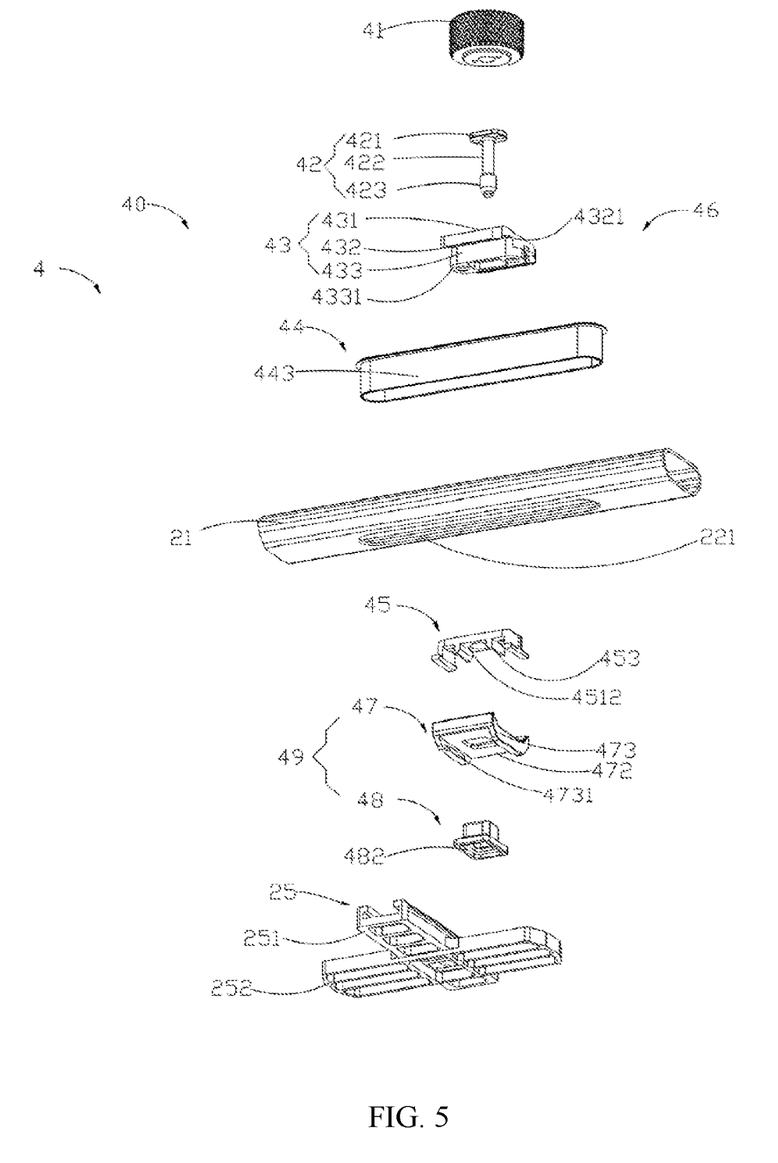
FIG. 5 is an exploded view of the partial structure of the load bracket in FIG. 4 from another direction.

FIG. 4 is an exploded view of the partial structure of the load bracket 2 consistent with the disclosure. FIG. 5 is an exploded view of the partial structure of the load bracket 2 from another direction consistent with the disclosure. As shown in FIGS. 3 to 5, the mounting plate 25 is fixed to the first guide rod 21 via the locking assembly 4. The mounting plate 25 includes a connecting member 251 and two mounting members 252. The two mounting members 252 are arranged at two side of the connecting member 251, and form a cross-shape together with the connecting member 251. In some embodiments, the connecting member 251 and the two mounting members 252 can be one-piece molded. In some other embodiments, the connecting member 251 and the two mounting members 252 can be separately provided and connected together through welding or bolting. In some embodiments, the connecting member 251 has a cuboid-shape. In some other embodiments, the connecting member 251 can have another shape. The connecting member 251 includes a bottom wall 2511, two side walls 2512, and two extending walls 2513. In some embodiments, the bottom wall 2511 has a cuboid-shape. The two side walls 2512 are arranged at two opposite sides of the bottom wall 2511 and approximately perpendicular to the bottom wall 2511. Bottom sides of the two side walls 2512 are aligned with a bottom side of the bottom wall 2511. In some embodiments, the two side walls 2512 are arranged at two longitudinal sides of the bottom wall 2511, and have a length equal to a length of the bottom wall 2511. The two extending walls 2513 are formed by inwardly protruding from top sides of the two side walls 2512, and are spaced at a certain distance from the bottom wall 2511. Therefore, each extending wall 2513 and a corresponding side wall 2512 form a longitudinal sliding slot 2514 together with the bottom wall 2511. A sliding groove 2510 is formed at an outer surface of each side wall 2512. A longitudinal direction of the sliding groove 2510 is parallel to a longitudinal direction of the connecting member 251. An end of each sliding groove 2510 is provided with a blocking portion. In some embodiments, the blocking portion includes a threaded through-hole 251a opened at a bottom of the sliding groove 2510 and a bolt (not shown in FIG. 4). The bolt can be screwed into the threaded through-hole 251a, and can be partially screwed into the sliding slot 2514, such that a portion of the bolt that penetrates into the sliding slot 2514 can function to block. In some other embodiments, the blocking portion can have another structure, such as a bump protruding from the bottom of the sliding groove 2510. It is not intended to limit the structure of the blocking portion here.

The two mounting members 252 are configured to fix the load 3. The two mounting members 252 are arranged outside the two side walls 2512, respectively. Bottom sides of the two mounting members 252 are aligned with the bottom side of the bottom wall 2511. The load 3 can be fixed to a bottom side of the mounting member 252.

As shown in FIG. 2, an X direction, a Y direction, and a Z direction are defined for illustration. The X direction, the Y direction, and the Z direction are perpendicular to each other.

As shown in FIGS. 4 and 5, the holding assembly 4 includes a driving member 42 and a clamping assembly 40. The driving member 42 can be connected to the clamping assembly 40. When the driving member 42 is operated, the driving member 42 can drive the clamping assembly 40 to lock a plurality of structures on the load bracket 2.

In some embodiments, the driving member 42 can include a screw. In some other embodiments, the driving member 42 can include other structural components, such as a stud, a telescopic rod, or the like.

In some embodiments, the driving member 42 includes a rotating portion 421, a connecting segment 422, and a screw portion 423. In some embodiments, the rotating portion 421, the connecting segment 422, and the screw portion 423 can have a cylinder-shape. The rotating portion 421 is formed by extending outwardly and perpendicularly from a side of the connecting segment 422. The locking assembly 4 further includes a knob 41 fixed on the rotating portion 421 of the driving member 42 and is configured to rotate the driving member 42. In some embodiments, the rotating portion 421 can be fixed to a bottom side of the knob 41 via a bolt. In some other embodiments, the rotating portion 421 can be fixed to the bottom side of the knob 41 via another manner, such as bonding, riveting, or the like, or the rotating portion 421 and the knob 41 can be one-piece molded.

In some embodiments, the load bracket 2 further includes an intermediate member 44. The intermediate member 44 includes an engaging wall 441, a guide groove 442, and an outer side wall 443. The engaging wall 441 can be engaged with an opening at an end of the receiving groove 211. The guide groove 442 is surrounded by the outer side wall 443, and the outer side wall 443 can be attached to the receiving groove 211. The engaging wall 441 is formed by extending from the outer side wall 443 in a direction perpendicular to the outer side wall 443. In some other embodiments, the intermediate member 44 can be omitted. In this situation, the receiving groove 211 can be also a guide groove.

In some embodiments, the clamping assembly 40 includes a first sliding member 46 and a second sliding member 49. The first sliding member 46 and the second sliding member 49 are connected via the driving member 42 and are cooperatively mounted at the first guide rod 21.

The first sliding member 46 can be mounted at the guide groove 442. When the locking assembly 4 is not locked, the first sliding member 46 can slide along the guide groove 442 or the receiving groove 211 to adjust and change a position of the load 3 in the Y direction. The first sliding member 46 includes a first clamping member 43 and a fixing member 45. The first clamping member 43 and the fixing member 45 can be fixedly connected to each other and inserted into the guide groove 442.

In some embodiments, the first clamping member 43 includes a mounting surface 431, a first clamping surface 432 opposite to the mounting surface 431, and a first protruding platform 433 extending vertically downward from the first clamping surface 432. The first protruding platform 433 includes a first fixing surface 4331 that is away from the first clamping surface 432. The first clamping surface 432 includes two rectangular grooves 4321. A width of each rectangular groove 4321 is approximately equal to a width of the engaging wall 441. The first clamping surface 432 faces the first guide rod 21 and attaches to a side of the first guide rod 21 on which the engaging wall 441 is mounted. A first through-hole 4310 is opened on the mounting surface 431. In some embodiments, the first through-hole 4310 can be arranged at a center of the mounting surface 431.

The fixing member 45 includes a second protruding platform 451, a first engaging portion 452, and a second engaging portion 453. The second protruding platform 451 includes a second fixing surface 4511 and a first abutting surface 4512 opposite to the second fixing surface 4511. The fixing member 45 and the first clamping member 43 can be fixedly connected to each other by screwing, bonding, or the like, such that the second fixing surface 4511 can be attached to the first fixing surface 4331. The first engaging portion 452 can be engaged with a side of the first guide rod 21 and can be opposite to the clamping surface 432. The second engaging portion 453 is formed by extending from the first abutting surface 4512 in a direction opposite to the Z direction. In some other embodiments, the second engaging portion 453 can be omitted. A second through-hole 4510 is opened in the second protruding platform 451, and the second through-hole 4510 can cooperate with the first through-hole 4310.

The second sliding member 49 is arranged between the first guide rod 21 and the mounting plate 25. When the lock assembly 4 is not locked, the second sliding member 49 can slide along the guide groove 442 along with the first sliding member 46 to adjust and change the position of the load 3 in the Y direction. The second sliding member 49 can also slide relative to the mounting plate 25 to adjust and change the position of the load 3 in the X direction. The second sliding member 49 includes a second clamping member 47 and an abutting member 48. The second clamping member 47 is fixedly connected to the abutting member 48. The second clamping member 47 can be fitted between the first engaging portion 452 and can attach to a side of the first guide rod 21 where the engaging wall 441 is not mounted.

The second clamping member 47 includes a second clamping surface 471, a second abutting surface 472 arranged opposite to the second clamping surface 471, and a protruding wall 473 formed by extending perpendicularly from the second abutting surface 472 in a direction away from the second clamping surface 471. The second clamping surface 471 is arranged toward the first guide rod 21 and opposite to the first clamping surface 432, and attaches to a surface of the first guide rod 21. The second abutting surface 472 is arranged toward the abutting member 48. A shape of the second abutting surface 472 is matched with an upper surface of the abutting member 48. In some embodiments, the second abutting surface 472 is a plane. The second abutting surface 472 abuts against the abutting member 48 when being mounted. The protruding wall 473 includes two sliding bars 4731 perpendicular to the protruding wall 473 and opposite to each other. The two sliding bars 4731 can slide in the sliding groove 2510. The second clamping surface 471 is also provided with a third through-hole 4710. In some embodiments, the third through-hole 4710 can be opened in a center of the second clamping surface 471, and the third through-hole 4710 can penetrate the second clamping member 47.

The abutting member 48 includes a third protruding platform 481 and a sliding block 482. In some embodiments, a cross section of the abutting member 48 has an inverted T-shape, and a width of the third protruding platform 481 is smaller than a width of the sliding block 482. In some embodiments, the third protruding platform 481 has a cuboid-like shape and it is not intended to limit the structure of the third protruding platform 481. The sliding block 482 can be arranged between the two extending walls 2512 of the mounting plate 25 and can slide along the sliding slot 2514. In some embodiments, a length and a width of the third protruding platform 481 are smaller than a length and a width of the third through-hole 4710, respectively. On the other hand, a length and a width of the sliding block 482 are greater than the length and the width of the third through-hole 4710, respectively. Therefore, the third protruding platform 481 can be inserted in the third through-hole 4710. A threaded hole 4810 is provided at the third protruding platform 481, and the threaded hole 4810 can be screwed to the screw portion 423. The threaded hole 4810 can match the first through-hole 4310 and the second through-hole 4510.

In some embodiments, during assembling, the intermediate member 44 can be embedded in the receiving groove 211. The first protruding platform 433 of the first clamping member 43 extends from a side of the guide groove 422 where the engaging wall 441 is arranged into the guide groove 422, and the second protruding platform 451 of the fixing member 45 extends from another side of the guide groove 442 into the guide groove 442. The first protruding platform 433 can fixedly connected to the second protruding platform 452. The first guide rod 21 can be sandwiched between the first clamping member 43 and the fixing member 45. The third protruding platform 481 of the abutting member 48 passes through the third through-hole 4710 of the second clamping member 47. The sliding bar 4731 of the second clamping member 47 slides in from an end of the mounting plate 25 along the sliding groove 2510. The threaded through-hole 251a of the mounting plate 25 is provided with the bolt to block the sliding block 482 and the sliding bar 4731. The connecting segment 422 of the driving member 42 sequentially passes through the first through-hole 4310 of the first clamping member 43, the second through-hole 4510 of the fixing member 45, and the third through-hole 4710 of the second clamping member 47. The screw portion 423 of the driving member 42 is screwed into the threaded hole 4810 of the abutting member 48.

Before the locking assembly 4 performs a locking action, the first sliding member 46 can slide along the guide groove 442, and the sliding block 482 of the abutting member 48 can slide along the sliding slot 2514 of the mounting plate 25 to adjust and change the position of the load 3.

When the locking assembly 4 is locked, the knob 41 can be rotated, such that the screw portion 423 of the driving member 42 and the threaded hole 4810 of the abutting member 48 can be further screwed. In this situation, the abutting member 48 can move toward the first guide rod 21, such that the sliding block 482 of the abutting member 48 can tightly abut against an upper wall of the sliding slot 2514 of the mounting plate 25 to tighten and lock the mounting plate 25. When the abutting member 48 moves toward the first guide rod 21, the mounting plate 25 is tightened. The extending wall 2513 of the mounting plate 25 can abut against the second abutting surface 472 of the second clamping member 47 to allow the first clamping member 43 and the second clamping member 47 to clamp the first guide rod 21 together, thereby locking the first sliding member 46. Two structures can be locked at the same time by simply operating one structure, which greatly improves the disassembling efficiency of the load bracket 2 and avoids the missing operation.

In some embodiments, as shown in FIGS. 1 and 2, the load bracket further includes a second guide rod 22, a third guide rod 23, and a fourth guide rod 24. The third guide rod 23 is arranged opposite to the first guide rod 21, and the second guide rod 22 is arranged opposite to the fourth guide rod 24. The first guide rod 21, the second guide rod 22, the third guide rod 23, and the fourth guide rod 24 are connected end to end to form a quadrilateral frame, and hence jointly form the pitch-axis bracket of the gimbal.

According to the disclosure, the load bracket 2 can utilize a driving connection between the driving member 42 of the locking assembly 4 and the abutting member 48, and clamping of the first guiding rod 21 by the first sliding member 46 and the second sliding member 49, and an abutting connection between the abutting member 48 and the mounting plate 25, and hence the first guide rod 21 and the mounting plate 25 of the load bracket 2 can be locked at the same time by simply operating the driving member 42. Therefore, a plurality of structures can be locked at the same time by simply operating one structure, which improves the disassembling/assembling efficiency of the load bracket 2 and avoids missing operation.

It is intended that the specification and examples be considered as exemplary only and not to limit the scope of the disclosure. Those skilled in the art will be appreciated that any modification or equivalents to the disclosed embodiments without departing from the spirit and scope of the present disclosure are intended to be encompassed within the scope of the present disclosure.

What is claimed is:

1. A load bracket comprising:
   a guide rod including a receiving groove, a longitudinal direction of the receiving groove being coincident with a longitudinal direction of the guide rod;
   a locking assembly arranged at the guide rod and slidable in the receiving groove;
   a mounting plate slidably arranged at the locking assembly;
   wherein the locking assembly includes:
      a clamping assembly arranged at the guide rod and connected to the mounting plate; and
      a driving member connected to the clamping assembly and configured to drive the clamping assembly to clamp the guide rod and to cause the mounting plate to abut against the clamping assembly.

2. The bracket of claim 1, further comprising:
   an intermediate member fitted in the receiving groove and including a guide groove is provided at the intermediate member;
   wherein the locking assembly is configured to slide in the guide groove.

3. The bracket of claim 1, wherein the driving member includes:

a screw portion inserted in the clamping assembly and screwed to the clamping assembly;
a rotating portion; and
a connecting segment arranged between the screw portion and the rotating portion;
wherein the driving member is configured to drive the mounting plate to abut against the clamping assembly in response to the screw portion rotating in a preset direction.

4. The bracket of claim 3, wherein the locking assembly further includes a knob fixed to the rotating portion and configured to rotate the screw portion.

5. The bracket of claim 3, wherein the clamping assembly includes a first sliding member and a second sliding member mounted at the guide rod and connected to each other via the driving member.

6. The bracket of claim 5, wherein the first sliding member includes a fixing member and a clamping member fixedly connected to each other and configured to clamp the guide rod.

7. The bracket of claim 6, wherein:
the clamping member includes:
  a clamping surface attached to a surface of the guide rod; and
  a first protruding platform extending vertically from the clamping surface and extending into the guide rod from a side of the receiving groove; and
the fixing member includes:
  a second protruding platform extending into the guide rod from another side of the receiving groove; and
  an engaging portion engaging with a side of the guide rod away from the clamping surface;
wherein:
  the first protruding platform and the second protruding platform are fixed to each other in the receiving groove; and
  the guide rod is arranged between the clamping surface and the engaging portion.

8. The bracket of claim 7, wherein:
the clamping member includes a first through-hole;
the fixing member includes a second through-hole;
the first through-hole and the second through-hole match each other;
the driving member is configured to pass through the first through-hole and the second through-hole; and
the connecting segment of the driving member is at least partially received in the first through-hole and the second through-hole.

9. The bracket of claim 7, wherein:
the clamping member is a first clamping member;
the mounting plate further includes a sliding slot;
the second sliding member includes:
  a second clamping member including a third through-hole at a center of the second clamping member; and
  an abutting member including:
    a third protruding platform configured to pass through the third through-hole and including a threaded hole; and
    a sliding block configured to slide in the sliding slot of the mounting plate;
  a threaded hole is provided at the third protruding platform; and
the screw portion and the threaded hole are screwed to each other to cause the abutting member to move toward the guide rod, causing the sliding block to abut against an upper wall of the sliding slot of the mounting plate to tighten and lock the mounting plate.

10. The bracket of claim 9, wherein the mounting plate includes:
a connecting member; and
two mounting members arranged at two sides of the connecting member and forming a cross-shape together with the connecting member.

11. The bracket of claim 10, wherein the connecting member includes:
a bottom wall;
two side walls arranged at two opposite long sides of the bottom wall and approximately perpendicular to the bottom wall, a length of each of the two side walls approximately equaling a length of the bottom wall; and
two extending walls protruding inwardly from top sides of the two side walls, respectively, and spaced at a certain distance from the bottom wall, one of the two extending walls forming the sliding slot together with a corresponding one of the side walls.

12. The bracket of claim 11, wherein:
the clamping surface is a first clamping surface;
the second clamping member includes:
  a second clamping surface;
  an abutting surface; and
  a protruding wall extending perpendicularly from the abutting surface in a direction away from the second clamping surface and including a sliding bar perpendicular to the protruding wall;
the mounting plate includes a sliding groove; and
the second clamping member is configured to slide in the sliding groove of the mounting plate via the sliding bar.

13. The bracket of claim 12, wherein the mounting plate further includes a blocking portion configured to block the second clamping member and the sliding block from sliding out of the sliding groove and the sliding slot.

14. The bracket of claim 13, wherein the blocking portion includes:
a threaded through-hole opened at a bottom of the sliding groove; and
a bolt screwed in the threaded through-hole and partially in the sliding slot.

15. The bracket of claim 12, wherein the sliding groove is opened at an outer surface of one of the side walls.

16. The bracket of claim 12, wherein the two extending walls of the mounting plate are configured to abut against the abutting surface of the second clamping member to cause the first clamping member and the second clamping member to clamp the guide rod together, in response to the screw portion screwing to the threaded hole.

17. The bracket of claim 1,
wherein the guide rod is the first guide rod;
the load bracket further comprising:
  a second guide rod;
  a third guide rod arranged opposite to the first guide rod; and
  a fourth guide rod arranged opposite to the second guide rod,
  wherein the first guide rod, the second guide rod, the third guide rod, and the fourth guide rod are connected end to end to form a quadrilateral frame.

18. A gimbal comprising:
a gimbal assembly and a load bracket connected to the gimbal assembly, wherein the load bracket includes:
  a guide rod including a receiving groove, a longitudinal direction of the receiving groove being coincident with a longitudinal direction of the guide rod;

a locking assembly arranged at the guide rod and slidable in the receiving groove;

a mounting plate slidably arranged at the locking assembly;

wherein the locking assembly includes:

a clamping assembly arranged at the guide rod and connected to the mounting plate; and a driving member connected to the clamping assembly and configured to drive the clamping assembly to clamp the guide rod and to cause the mounting plate to abut against the clamping assembly.

19. The gimbal of claim 18, wherein the gimbal assembly comprises:

a roll-axis assembly;

a pitch-axis assembly;

a yaw-axis assembly, and the load bracket is connected to the yaw-axis assembly.

\* \* \* \* \*